United States Patent [19]

Loveless

[11] 4,382,452
[45] May 10, 1983

[54] EXHAUST FLOW CONTROL VALVE FOR MANIFOLD PLATE

[75] Inventor: Stanley M. Loveless, Oshtemo Township, Kalamazoo County, Mich.

[73] Assignee: Humphrey Products Company, Kalamazoo, Mich.

[21] Appl. No.: 258,081

[22] Filed: Apr. 27, 1981

[51] Int. Cl.³ .............................................. F16K 11/00
[52] U.S. Cl. .............................. 137/625.43; 251/121; 251/191; 251/208; 251/205
[58] Field of Search ............... 251/121, 189, 191, 205, 251/208; 137/625.43; 138/46

[56] References Cited

U.S. PATENT DOCUMENTS

| | | | |
|---|---|---|---|
| 1,521,081 | 12/1924 | Dooling | 251/191 X |
| 2,992,808 | 7/1961 | Burritt | 251/205 |
| 3,060,970 | 10/1962 | Aslan | 137/625.43 X |
| 3,217,735 | 11/1965 | Stalter . | |
| 3,260,498 | 7/1966 | Johnson | 251/189 |
| 3,420,499 | 1/1969 | Pletcher | 251/191 X |
| 4,089,504 | 5/1978 | Giuliani | 251/189 X |

FOREIGN PATENT DOCUMENTS 331216  7/1903  France ................. 251/191

Primary Examiner—Harold W. Weakley
Attorney, Agent, or Firm—Flynn, Thiel, Boutell & Tanis

[57] ABSTRACT

A throttle valve assembly for controlling flow of air through a passage. A housing is provided having a straight flow passage extending therethrough. The housing also has a bore formed therein in intersecting relationship to the passage. A valve is movably positioned within the bore for adjustably restricting the flow of air through the passage. The valve includes an elastomeric sleeve coaxially aligned with and positioned within the bore and being axially movable therealong into a position wherein the sleeve means extends across the passage. Relatively movable abutments coact with the sleeve when the latter is in said position for resiliently deforming the sleeve into at least partial sealing engagement with the housing for restricting or preventing flow of air through the passage.

10 Claims, 5 Drawing Figures

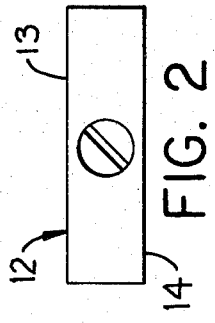
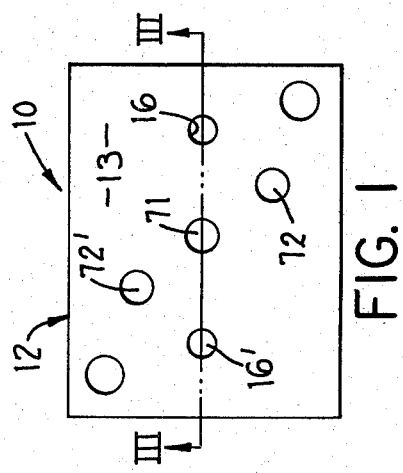
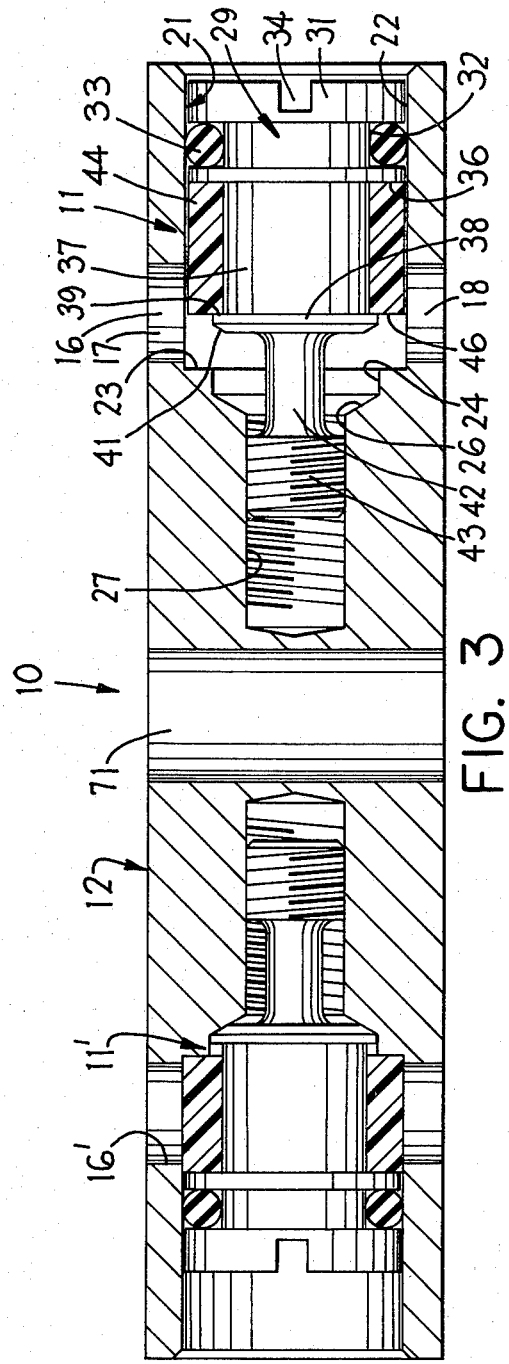

EXHAUST FLOW CONTROL VALVE FOR MANIFOLD PLATE

FIELD OF THE INVENTION

This invention relates to an improved throttle valve assembly for controlling the flow of a gaseous fluid through a passage and, in particular, to an improved exhaust flow-control valve for controlling flow through a straight passage as associated with a manifold plate adapted to be mounted between a manifold and a main control valve.

BACKGROUND OF THE INVENTION

It is often desirable to control the speed at which air can flow through a passage as associated with a pneumatic system, such as by controlling the speed at which exhaust air can escape through a passage. One common utilization of this principle is in association with a double-acting air cylinder for controlling the escape of exhaust air from one or both sides of the cylinder so as to control the piston movement in one or both directions. At the present time, this controlled escape of exhaust air is accomplished by conventional flow-control devices which are installed directly within the air line between the cylinder and the main control valve. Such a conventional flow control device typically employs a one-way ball check valve and an adjustable throttle valve connected in parallel therewith, whereby the device normally allows full flow in one direction, and controlled flow in the other. Such device, however, is expensive and complex, is generally more difficult to install and adjust, and results in the overall system being more complex and less flexible.

In other circumstances, control over the flow of exhaust gas may also be accomplished at the main flow valve, either by an exhaust control(s) built into the valve or by a separate control located between the valve and subplate or manifold. It has generally been preferred to provide a separate control, which control may be installed between the main valve and the subplate or manifold on which the main valve is typically mounted. Such a control, which is generally cheaper than the conventional device as described aforesaid, has conventionally been built utilizing a conventional adjustable needle screw as a throttling member. This type throttling member normally requires that the flow passage undergo a change of direction since the adjustable needle valve can be made to perform a proper and sensitive throttling action only when it is positioned in close proximity to a valve seat, which seat can be properly provided only at a right-angle junction associated with the flow passage. However, in many situations, particularly when mounting a throttle or exhaust speed control valve between a main valve and a manifold or subplate, it is not practical to change the flow direction within a device possessing the necessary simplicity and compactness, and hence control over the exhaust air becomes difficult if not impossible by utilization of such conventional means.

Accordingly, the present invention relates to an improved throttle valve assembly which permits simple and practical control over the flow of air through a straight passage, such as by controlling the speed of exhaust air through a straight passage, whereby the throttle valve assembly of this invention thus overcomes the disadvantages mentioned above.

More specifically, the present invention relates to a throttle valve assembly which can be mounted in a small and compact housing plate having a through straight passage for the air, such as the exhaust air, whereby the housing plate can be simply and compactly mounted directly between a main flow-control valve and its sub-base or manifold. The housing plate has the throttle valve adjustably mounted thereon in intersecting relationship with the straight through passage for adjustably controlling the speed or flow of air therethrough. This throttle valve employs an actuating member which is threadably mounted within a bore formed in the housing plate, which bore is perpendicular to and intersects the through straight passage. The actuating member has a cylindrical sleeve of elastomeric material mounted in surrounding relationship thereon and confined between a pair of axially spaced flanges. This sleeve projects at least part way into the through straight passage and by rotationally threadably adjusting the actuating member, the sleeve is moved axially so as to extend totally across the passage, whereupon one end of the sleeve abuts a shoulder on the housing so that subsequent rotation of the actuating member causes axial compression of the elastomeric sleeve, accompanied by radial expansion thereof, so as to effect sealing of the sleeve with the housing so as to permit a total closing off of the passage.

Thus, one of the objects of this invention is the provision of a throttle valve assembly which permits control of flow through a straight flow passage, whereby the resultant throttle valve assembly can be a simple and economical structure which can be incorporated within a relatively flat plate or housing to facilitate its use in a simple and efficient manner directly between a main valve assembly and its sub-base or manifold.

It is also an object of this invention to provide an improved throttle valve assembly, as aforesaid, which permits the flow to be simply but precisely adjusted, with the flow through said passage being adjustable throughout a range which extends from a fully closed to a fully opened position.

Other objects and purposes of the invention will be apparent after reading the following specification and inspecting the accompanying drawings.

BRIEF DESCRIPTION OF THE DRAWINGS

FIG. 1 is a plan view of the throttle valve assembly according to this invention.

FIG. 2 is an end view of FIG. 1.

FIG. 3 is an enlarged sectional view taken substantially along line III—III in FIG. 1.

Figure 4:
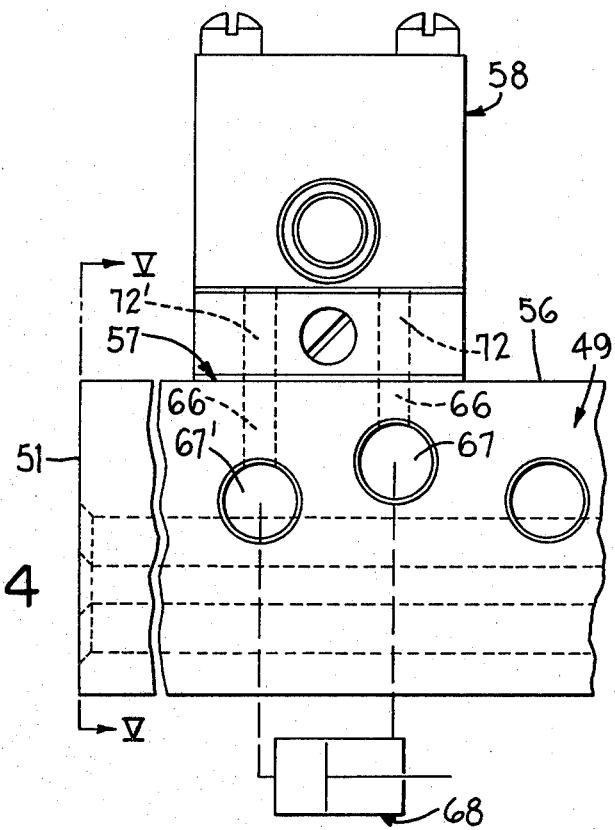
FIG. 4 is a side elevational view showing a main control valve, such as a four way valve, mounted on a manifold or subplate, with the improved throttle valve of this invention interposed therebetween.

Certain terminology will be used in the following description for convenience in reference only, and will not be limiting. For example, the words "upwardly", "downwardly", "rightwardly" and "leftwardly" will refer to directions in the drawings to which reference is made. The words "inwardly" and "outwardly" will refer to directions toward and away from, respectively, the geometric center of the device and designated parts thereof. Said terminology will include the words specifically mentioned, derivatives thereof, and words of similar import.

DETAILED DESCRIPTION

Referring to FIGS. 1–3, there is illustrated a throttle valve assembly 10 according to the present invention. This assembly 10 includes an adjustable throttle valve 11 movably mounted within a housing 12.

Considering first the housing 12, same comprises a blocklike or platelike element having substantially parallel upper and lower surfaces 13 and 14, respectively. A straight bore or passage 16 extends perpendicularly across the housing 12 between the upper and lower surfaces 13 and 14. The upper end of this bore 16 functions as an inlet 17, whereas the lower end functions as an outlet 18. This passage 16 has air flowing therethrough, such as air exhausted from a load device such as a cylinder.

Housing 12 also has a stepped bore 21 formed therein for accommodating the adjustable throttle valve 11. This stepped bore 21 perpendicularly intersects the passage 16 and, in fact, the longitudinal centerlines of passage 16 and bore 21 perpendicularly intersect one another.

The stepped bore 21 includes an enlarged cylindrical bore 22 which opens inwardly from the end wall of housing 12, which bore 22 extends axially inwardly so as to intersect the passage 16. Bore 22 terminates at an annular shoulder 23 formed on the housing, which shoulder is located closely adjacent but just past the peripheral extremity of the passage 16. A further bore 24 of reduced diameter projects coaxially inwardly from the shoulder 23, which bore 24 is of short axial extent and terminates in a conically tapered shoulder or seat 26. A further bore 27 of substantially reduced diameter extends coaxially inwardly from the seat 26, which bore 27 is internally threaded and terminates blindly within the housing.

The adjustable throttle valve 11 is movably disposed within the stepped bore 21 and, as illustrated in FIG. 3, includes an elongated substantially cylindrical actuating member 29 which is also of a stepped configuration. This actuating member 29, at its axially outer end, includes a cylindrical guide portion 31 which is snugly but rotatably and axially slidably disposed within the enlarged bore 22. This cylindrical guide portion 31 is preferably provided with a surrounding annular groove 32 in which is accommodated a conventional elastomeric seal ring 33, such as an O-ring, so as to create a sealed relationship between the actuating member and the housing. The exposed or accessible end of guide portion 31 is preferably provided with means therein, such as a slot 34, so as to enable a tool such as a screwdriver to be engaged therewith for purposes of rotational adjustment.

The actuating member 29 also includes a central cylindrical portion 37 which is coaxial with and projects axially inwardly from the guide portion 31, which central cylindrical portion 37 extends inwardly through an axial extent which slightly exceeds the diameter of passage 16. This central cylindrical portion 37 is of substantially smaller diameter than the guide portion 31 and hence results in an annular shoulder 36 at the interface therebetween. The other end of central cylindrical portion 37 terminates in a radially enlarged annular flange 38 which also results in a further annular shoulder 39 at the interface therebetween, which latter shoulder 39 is axially opposed to the aforesaid shoulder 36. The flange 38 is of larger diameter than the central cylindrical portion 37, but is of smaller diameter than the guide portion 31, so that this flange 38 is thus closely but slidably accommodated within the bore 24. The rear end of flange 38 is conically tapered, as at 41, so as to be engageable with the conical seat 26 to thereby limit the axially innermost position of the actuating member.

A reduced diameter, coaxial stem 42 projects inwardly from the flange 38. This stem 42 terminates in a somewhat enlarged cylindrical portion 43, the latter being externally threaded and disposed in threaded engagement with the internally threaded bore 27.

The actuating member 29 has a sealing sleeve 44 mounted thereon in surrounding relationship to the central cylindrical portion 37, which sleeve 44 is axially confined between the opposed shoulders 36 and 39. The sleeve 44 is constructed of an elastomeric material, such as polyurethane. When in a noncompressed or nonstressed condition, the elastomeric sleeve 44 has an axial length which substantially equals the axial spacing between the opposed shoulders 36 and 39, which axial length slightly exceeds the diameter of passage 16. When in this unstressed or uncompressed condition, the elastomeric sleeve 44 has an outside diameter which is substantially equal to or only slightly smaller than the diameter of bore 21 so as to enable the sleeve 44 to be axially slidably displaced relative to the housing. The sleeve 44, as illustrated by FIG. 3, hence projects radially outwardly beyond the annular flange 38 so as to be positioned for engagement with the shoulder 23.

The throttle valve assembly 10, in the preferred embodiment, is provided with the adjustable throttle valve 11 as described above, and also has a second identical adjustable throttle valve 11' which extends inwardly from the opposite side of the housing in coaxial alignment with the valve 11. By providing two such adjustable throttle valves within a single housing, the assembly can be used with a four-way valve so as to permit selected control over the exhaust air as discharged from both sides of a conventional air cylinder. However, the present invention can obviously utilize only a single throttle valve associated with the housing, if desired.

OPERATION

The adjustable valve 11 can be axially adjusted relative to the housing 12 over a substantial range, such as from a substantially fully open position as illustrated by the valve 11 in FIG. 3, to a substantially fully closed position as illustrated by the opposite valve 11' in FIG. 3. When in the fully open position, the actuating member 29 is positioned so that the elastomeric sleeve 44 projects only partially across the passage 16 and hence does not significantly interfere with the flow of air therethrough. However, when it is desired to restrict the flow of air through passage 16, such as to control the speed of movement of a piston associated with an air cylinder, then the actuating member 29 is rotated, as by a screwdriver or other tool, whereupon the threaded engagement between the actuating member and the threaded bore 27 causes the member to be moved axially inwardly so that the sleeve 44 hence extends across a greater portion of the passage 16 and thus begins to interfere, and hence restrict, the flow of air through the passage 16. The greater the inward axial movement of the actuating member 29 and sleeve 44, the greater the throttling or restricting effect, and hence the greater the reduction in the flow of air through the passage 16. As the actuating member 29 is adjusted axially inwardly, a point is reached when the sleeve 44 extends totally across the passage 16, although even under this condition a limited controllable flow of air still occurs through the passage 16 inasmuch as this sleeve 44 is not sealingly engaged with the housing 12.

As the actuating member is axially adjusted inwardly an even greater extent, the inner axial end 46 of sleeve 44 contacts the annular housing shoulder 23. Continued axial screwing of the actuating member into the housing thus results in the shoulder 36 being moved axially toward the housing shoulder 23 so that the elastomeric sleeve 44 is hence axially compressed, which in turn causes an elastic radial expansion of the sleeve 44 so that it moves into snug sealing engagement with the housing sidewall defining the bore 21, which sealing engagement exists around the openings in the housing defined by the passage 16. As the elastomeric sleeve 44 is subject to axial compression and radial expansion as explained above, the controlled flow of air through the passage 16 gradually diminishes until the passage 16 is effectively closed.

The threaded actuating member 29 can be screwed axially inwardly until the conical seat 41 abuts the conical seat 26, whereupon further inward axial movement of the actuating member is prevented. The permissible axial compression of the sleeve 44 is thus limited to a preselected amount, and hence damage to the sleeve can be effectively prevented.

Figure 5:
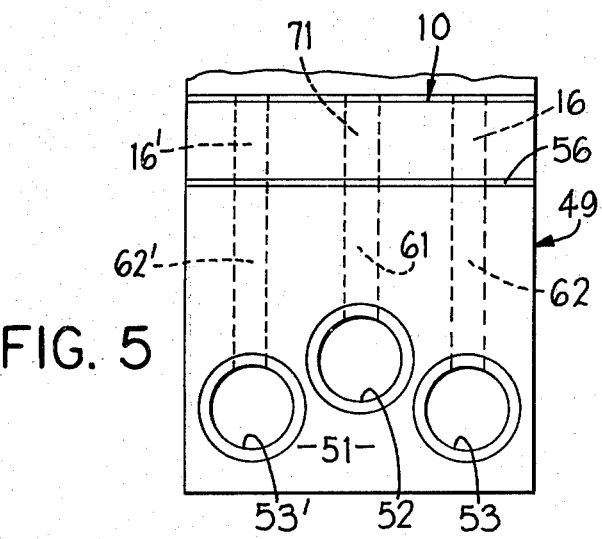
FIG. 5 is an elevational view taken substantially along line V—V in FIG. 4.

Referring now to FIGS. 4 and 5, there is illustrated the manner in which the throttle valve assembly 10 is utilized in conjunction with a main valve assembly and its associated manifold or sub-base. Specifically, FIGS. 4 and 5 illustrate a sub-base 49, particularly a manifold of the type adapted to have several different valves mounted thereon for connection to common supply and exhaust passages. The manifold 49, as is conventional, is of a blocklike construction and is provided with an air supply passage 52 which extends longitudinally of the manifold. A pair of similar exhaust passages 53 and 53' also extend longitudinally of the manifold. The manifold top wall 56 has several identical mounting locations 57 therealong, each of which permits a valve unit 58, such as a conventional four-way spool valve, to be mounted thereon. To permit air to be supplied to and exhausted from the valve unit 58, a first supply port 61 extends from the top wall 56 and intersects the supply passage 52 so as to permit pressurized air to be supplied to the valve unit. The exhausted air from the valve unit 58 flows through exhaust ports 62 and 62', the latter respectively communicating with the exhaust passages 53 and 53'. Further passages 66 and 66' extend into the manifold from the valve unit 58, which passages 66 and 66' respectively communicate with load ports 67 and 67' which extend transversely through the adjacent sidewall of the manifold. These load ports 67 and 67' can be suitably connected via appropriate conduits to a load device, such as the opposite ends of a conventional air cylinder 68.

The valve unit 58 can be a conventional four-way valve of the general type illustrated by U.S. Pat. Nos. 3,993,091; 4,026,325 or 4,187,884, so that further description of same is believed unnecessary. The valve unit can be mounted directly on the top wall of the manifold with a suitable seal ring or gasket being interposed therebetween.

In the event that control over the flow of exhaust air is desired, then the improved throttle valve assembly 10 of this invention can be fixedly interposed between the valve unit 58 and the manifold 29, as illustrated in FIGS. 4 and 5. With the assembly 10 mounted between the valve unit and the manifold, the exhaust passages 16 and 16' are aligned with the manifold exhaust ports 62 and 62' respectively, so that either throttle valve 11 or 11' can be suitably adjusted as desired so as to restrict the exhaust of air for controlling the speed of the piston associated with cylinder 68. The throttle valve assembly 10 also has a central opening 71 therethrough which aligns with the manifold supply port 61, and further load-connecting openings 72 and 72' also extend through the housing 12 and hence align with the load passages 66 and 66', respectively.

In operation, such as when the valve unit 58 of FIGS. 4 and 5 comprises a four-way valve, then with the valve in one extreme position, pressurized air is supplied from supply passage 52 through supply port 61 and supply opening 71 into the valve, from which the pressurized air passes through the load opening 72 and load passage 66 into load port 67 for supply to one end of the cylinder. Since this pressurized air thus drives the piston in a first direction, the air on the other side of the piston is exhausted and flows through load port 67' and passage 66' up through load opening 72' into the four-way valve, and thence back out the exhaust passage 16' and exhaust port 62' into the exhaust passage 53'. If suitably adjusted, the throttle valve 11' restricts and thus controls the flow of air as it is exhausted through the passage 16', thereby regulating the speed of movement of the cylinder piston.

When the four-way spool valve is shifted into its opposite position, then the same operational sequence occurs only in the reverse direction. That is, pressurized air again flows from supply passage 52 through supply port 61 and supply opening 71 into the valve, and thence through the load opening 72' and load passage 66' into load port 67' for pressurizing the other end of the cylinder to thereby move the piston in the opposite direction. The air on the other side of the piston is then exhausted into the load port 67 through load passage 66 and load opening 72 into the valve, and thence flows through exhaust passage 16 and exhaust port 62 into the exhaust passage 53. The throttle valve 11, if suitably adjusted, restricts and controls the flow of exhaust air through the passage 16 to thereby regulate the speed or displacement rate of the cylinder piston.

The adjustable throttle valve assembly 10 of this invention hence permits extremely simple yet precise adjustment over the flow rate of air through an exhaust passage, and yet accomplishes this by a structure which can be easily interposed directly between the valve unit and its subplate or manifold. This also enables the throttle valve to be associated with a straight through passage, such as the passage 16 or 16', so that the resulting structure is extremely compact and simple, and yet permits simple, efficient and precise control over the flow.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. A throttle valve assembly for controlling flow of fluid through a passage, comprising:
   a housing having a straight flow passage extending therethrough, said housing also having a bore formed therein in intersecting relationship to said passage;

valve means movably positioned within said bore for adjustably restricting the flow of fluid through said passage, said valve means including an elastomeric sleeve coaxially aligned with and positioned within said bore and being axially movable therealong into a position wherein said sleeve extends across said passage, said valve means including an actuating member which is axially movably positioned within said bore and has said elastomeric sleeve mounted thereon in encircling relationship therewith;

relatively movable abutment means coacting with said elastomeric sleeve when the latter is in said position for resiliently axially compressing and radially deforming said sleeve into at least partial sealing engagement with said housing for restricting or preventing flow of fluid through said passage;

said abutment means including a first abutment disposed adjacent one side of said passage and fixed to said actuating member directly adjacent one axial end of said elastomeric sleeve for engaging the latter, said abutment means including a second abutment fixedly mounted relative to said housing adjacent the other side of said passage and disposed for direct engagement with the other axial end of said elastomeric sleeve, whereby movement of said actuating member in a selected axial direction relative to said housing causes said first and second abutments to relatively move toward one another and engage the opposite ends of said elastomeric sleeve and effect axial compression thereof accompanied by radial expansion of said sleeve into sealing engagement with said housing in surrounding relationship to said passage;

said bore being of a stepped configuration and including a first cylindrical opening of a first diameter extending inwardly from a peripheral wall of said housing through an axial extent whereby said first cylindrical opening is perpendicular to and intersects said passage, said first opening terminating at its inner end in an annular shoulder formed on said housing, which said annular shoulder defines said second abutment, said annular shoulder being disposed in close proximity to the periphery of said passage adjacent the side thereof which is remote from the open end of said bore;

said stepped bore including a second cylindrical opening of a second diameter which is smaller than said first diameter, said second opening being coaxially aligned with said first opening and extending inwardly from said shoulder, said second opening terminating at its inner end in a stop surface;

said actuating member including a first cylindrical portion on the outer axial end thereof which is snugly but rotatably and axially slidably accommodated within said first opening, said actuating member including a second cylindrical portion which is of smaller diameter than said first cylindrical portion and extends coaxially inwardly therefrom through a selected distance which at least slightly exceeds the diameter of said passage, said second cylindrical portion at its inner axial end being slidably accommodated within said second opening and adapted to abut against said stop surface, said first cylindrical portion at its interface with said second cylindrical portion defining thereon an annular abutment surface which comprises said first abutment and is disposed in axially opposed relationship to said second abutment as formed on said housing, said elastomeric sleeve being disposed in surrounding relationship to said second cylindrical portion and when in an uncompressed condition having an axial length greater than the diameter of said passage, said sleeve when in an uncompressed condition having an outer diameter which is approximately equal to said first diameter.

2. A valve assembly according to claim 1, wherein said actuating member and said bore have opposed portions disposed in threaded engagement for permitting the actuating member to be axially movably displaced along said bore in response to rotation of said actuating member.

3. A valve assembly according to claim 1, wherein a third abutment is fixed to said actuating member in opposed but axially spaced relationship from said first abutment so that the first and third abutments closely axially confine said elastomeric sleeve therebetween when the sleeve is in an unstressed or uncompressed condition, said third abutment comprising an annular shoulder having a maximum diameter which is substantially less than the outer diameter of said sleeve, said second abutment as formed on said housing having a minimum diameter which is less than the outer diameter of said sleeve but greater than the maximum diameter of said third abutment, so that said third abutment can axially move into positions located on either axial side of said second abutment.

4. A valve assembly according to claim 1, wherein said housing comprises a platelike member bounded by substantially planar parallel exterior surfaces, said passage extending through said platelike member in perpendicular relationship between said exterior surfaces so that the opposite ends of said passage open through said exterior surfaces.

5. An assembly according to claim 4, including a valve unit fixedly mounted on said housing adjacent one of said exterior surfaces, and a sub-base fixedly mounted on said housing adjacent the other exterior surface, said sub-base having supply and exhaust passages formed therein for communication with said valve unit through said valve assembly, said exhaust passage being disposed in direct communication with said passage in said valve assembly, said sub-base also having two load-connecting passages formed therein and communicating with the said valve unit through said valve assembly.

6. A valve assembly according to claim 1, wherein said stepped bore includes a third cylindrical opening of a third diameter which is smaller than said second diameter and which projects coaxially inwardly from said stop surface, said third opening being internally threaded, and said actuating member including a third cylindrical portion which is fixed to and positioned axially inwardly from said second cylindrical portion, said third portion being externally threaded and disposed in threaded engagement with said third opening.

7. A throttle valve assembly for controlling flow of fluid through a passage, comprising:

a housing having a straight flow passage extending therethrough, said housing also having a bore formed therein in intersecting relationship to said passage;

valve means movably positioned within said bore for adjustably restricting the flow of fluid through said passage, said valve means including an elastomeric sleeve coaxially aligned with and positioned within said bore and being movable axially therealong between an open position wherein the sleeve projects no more than only partially into said passage and a closed position wherein said sleeve extends completely across said passage for sealingly closing off the latter, said valve means including an actuating member which is axially movably positioned within said bore and intersectingly extends across said passage when said valve means is in both said open and said closed position, said actuating member having said elastomeric sleeve mounted thereon in encircling relationship thereto; relatively movable abutment means coacting with said elastomeric sleeve when the latter is in or closely adjacent said closed position for axially compressing and resiliently radially deforming said sleeve into at least partial sealing engagement with said housing for restricting or preventing flow of fluid through said passage, said abutment means including a first annular abutment disposed on one side of said passage and fixed to said actuating member directly adjacent one axial end of said elastomeric sleeve for engaging the latter, said abutment means including a second annular abutment fixedly mounted relative to said housing adjacent the other side of said passage and disposed for direct engagement with the other axial end of said elastomeric sleeve when said valve means is in or closely adjacent said closed position, whereby movement of said actuating member axially of said bore from said open position toward said closed position causes said first and second abutments to relatively move toward one another and engage the opposite ends of said elastomeric sleeve when said valve means approaches said closed position for effecting axial compression of said sleeve accompanied by radial expansion thereof into sealing engagement with said housing in surrounding relationship to said passage;

said bore being of a stepped configuration and including a first cylindrical opening of a first diameter extending inwardly of said housing through an axial extent whereby said first cylindrical opening is perpendicular to and intersects said passage, said first opening terminating at its inner end in an annular shoulder formed on said housing, which said annular shoulder defines said second abutment, said annular shoulder being disposed in close proximity to the periphery of said passage adjacent the side thereof which is remote from the open end of said bore, whereby said annular shoulder is engageable with the axial end of the elastomeric sleeve when said valve means closely approaches said closed position;

said stepped bore including a second cylindrical opening of a second diameter which is substantially smaller than said first diameter, said second opening being coaxially aligned with said first opening and extending inwardly from said shoulder, said second opening being internally threaded;

said actuating member including a first cylindrical portion on the outer axial end thereof which is movably positioned within said first opening, said first cylindrical portion having said elastomeric sleeve mounted therearound so that said sleeve substantially totally occupies but is slidable along said first opening, said actuating member having a radially enlarged annular flange formed thereon adjacent the outer end of said first cylindrical portion for defining thereon said first abutment; and said actuating member including a second cylindrical portion which is coaxially fixed to said first cylindrical portion and projects inwardly therefrom into said second opening, said second cylindrical portion being externally threaded and disposed in threaded engagement with said second opening.

8. A valve assembly according to claim 7, wherein said actuating member includes a third cylindrical portion which is elongated and extends coaxially between and is fixedly joined to said first and second cylindrical portions, said third cylindrical portion being of significantly reduced diameter in relationship to said first and second cylindrical portions, said third cylindrical portion also having a diameter which is substantially smaller than the diameter of said passage, said third cylindrical portion extending intersectingly across said passage when said valve means is in or adjacent said open position.

9. A valve assembly according to claim 8, wherein said actuating member includes a further annular flange located at the junction between said first and third cylindrical portions, said further annular flange being of slightly larger diameter than said first cylindrical portion so that said further annular flange partially radially overlaps the adjacent end of said elastomeric sleeve, whereby said elastomeric sleeve is axially confined between said first abutment and said further annular flange and is normally maintained in an axially noncompressed condition, said further flange being of smaller diameter than said second abutment so that the adjacent end of said elastomeric sleeve can directly engage said second abutment when said valve means is moved into or adjacent said closed position.

10. A valve assembly according to claim 9, wherein said further annular flange defines thereon a first stop surface, and wherein said housing has a second annular stop surface formed thereon in encircling relationship to said second opening, said second stop surface being abuttingly engaged by said first stop surface when said valve member is in a fully closed position to limit the axial compression of said sleeve.

* * * * *